United States Patent
Fortune et al.

(10) Patent No.: US 6,392,166 B1
(45) Date of Patent: May 21, 2002

(54) STRESS RELIEF METHOD FOR A FLUID FILLED ELASTOMERIC BLADDER

(75) Inventors: Duane Donald Fortune, Lebanon; Morgan D. Murphy; Gregory Allen Cobb, both of Kokomo; Julia Ann Oberlin, Windfall; Phillip E Kaltenbacher, II, Kokomo, all of IN (US)

(73) Assignee: Delphi Technologies, Inc., Troy, MI (US)

( * ) Notice: Subject to any disclaimer, the term of this patent is extended or adjusted under 35 U.S.C. 154(b) by 57 days.

(21) Appl. No.: 09/707,605

(22) Filed: Nov. 8, 2000

Related U.S. Application Data
(60) Provisional application No. 60/178,880, filed on Jan. 28, 2000.

(51) Int. Cl.⁷ .............................. F27D 3/00; B29C 71/00; G01G 5/04; B60K 28/04
(52) U.S. Cl. ................. 177/144; 177/208; 177/254; 180/273; 701/45; 280/735; 432/9; 432/13; 264/345; 264/346; 264/348
(58) Field of Search .................. 280/735; 180/273; 177/136, 144, 210 R, 208, 209, 254; 701/45; 340/667; 264/345, 346, 348; 432/9, 13, 29

(56) References Cited

U.S. PATENT DOCUMENTS

| | | | | |
|---|---|---|---|---|
| 4,085,810 A | * | 4/1978 | Wellman | 177/209 |
| 5,259,999 A | * | 11/1993 | Iwakiri et al. | 264/346 |
| 5,489,404 A | * | 2/1996 | LeGrand et al. | 264/346 |
| 5,987,370 A | * | 11/1999 | Murphy et al. | 701/45 |
| 6,058,341 A | * | 5/2000 | Myers et al. | 701/45 |
| 6,101,436 A | * | 8/2000 | Fortune et al. | 701/45 |
| 6,138,067 A | * | 10/2000 | Cobb et al. | 701/45 |

* cited by examiner

Primary Examiner—Randy W. Gibson
(74) Attorney, Agent, or Firm—Jimmy L. Funke

(57) ABSTRACT

An improved method of producing a fluid filled elastomeric bladder for occupant weight sensing involves annealing the bladder material prior to its installation in a vehicle seat so as to quickly relieve initial stress due to stretching of the bladder material which occurs during fluid injection. In a preferred implementation, the initial stress is relieved by immersing the fluid-filled bladders in heated water for a time period on the order of 60 seconds or more. Alternatively, the bladder material may be heated with steam or radiant heat, by injecting heated fluid into the bladder, or by injecting heated air into an empty bladder before fluid injection. In each case the initial stress is quickly relieved, substantially eliminating a potential source of error in the sensed weight.

14 Claims, 2 Drawing Sheets

STRESS RELIEF METHOD FOR A FLUID FILLED ELASTOMERIC BLADDER

This application claims priority from Provisional application Ser. No. 60/178,880, filed Jan. 28, 2000.

TECHNICAL FIELD

This invention relates to vehicle occupant weight sensing with fluid filled seat bladders, and more particularly method of relieving initial stress in the fluid filled seat bladders.

BACKGROUND OF THE INVENTION

Vehicle occupant weight detection has been used as a means of identifying occupant presence and type (i.e., adult or child) in connection with the deployment of inflatable restraints in a severe crash event. A particularly effective technique for detecting occupant weight is disclosed in the U.S. Pat. No. 5,987,370 to Murphy et al., assigned to the assignee of the present invention, and incorporated by reference herein. In Murphy et al., a fluid filled elastomeric bladder is installed in or under the foam cushion of a vehicle seat bottom, and a pressure sensor coupled to an exit port of the bladder senses the pressure of the fluid as a measure of occupant weight applied to the seat bottom. See also, the related U.S. Pat. Nos. 6,058,341 and 6,101,436, and the allowed U.S. Pat. No. 6,138,067, which likewise are assigned to the assignee of the present invention and likewise are incorporated herein by reference.

In developing the aforementioned bladder-based weight sensing, we have observed that stretching of the bladder material during fluid filling creates an initial stress in the bladder material that is gradually relieved over time. Unfortunately, such stress produces error in the occupant weight indication that cannot be not easily compensated by an offset or the like.

SUMMARY OF THE INVENTION

The present invention is directed to an improved method of producing a fluid filled elastomeric bladder for occupant weight sensing in which an initial stress due to stretching of the bladder material is quickly relieved by annealing the bladder material prior to its installation in a vehicle seat. In a preferred embodiment, the initial stress is relieved by immersing the fluid-filled bladders in heated water for a time period on the order of 60 seconds or more. Alternatively, the bladder material may be heated with steam or radiant heat, by injecting heated fluid into the bladder, or by injecting heated air into an empty bladder before fluid injection. In each case the initial stress is quickly relieved, substantially eliminating a potential source of error in the sensed weight.

DESCRIPTION OF THE PREFERRED EMBODIMENT

Figure 1A:
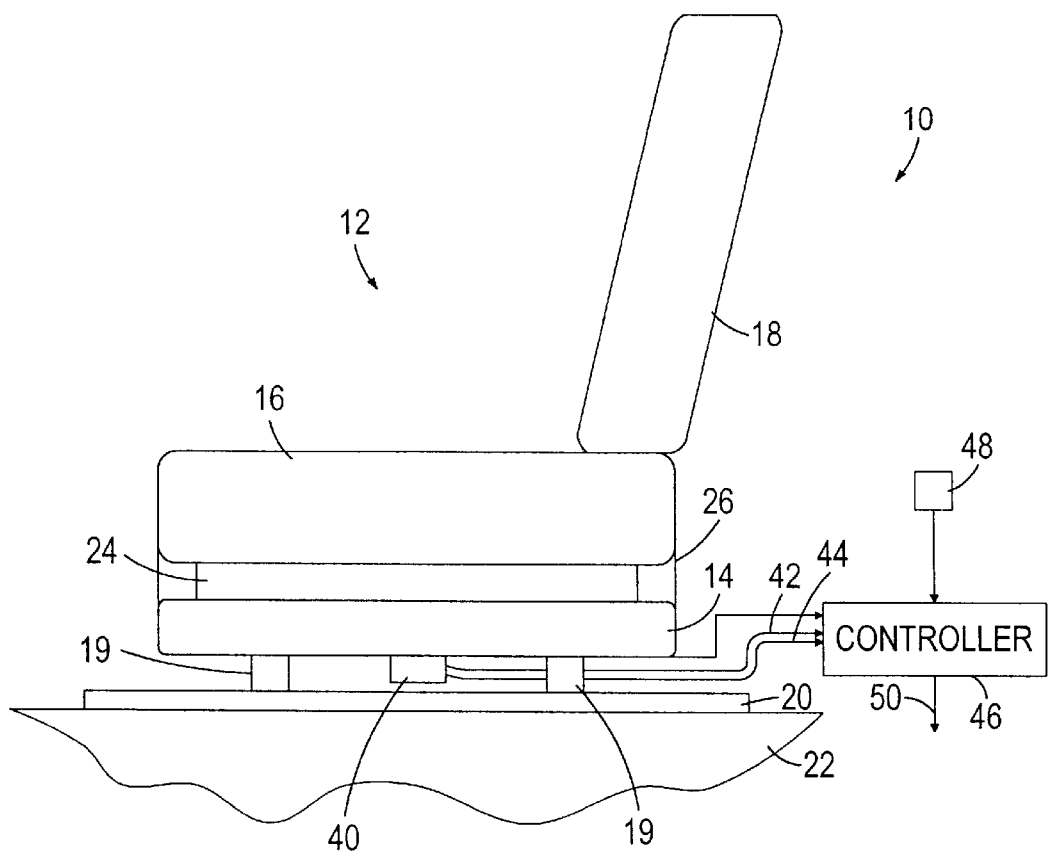
FIG. 1A is a system diagram illustrating a passenger seat of a vehicle equipped with a fluid-filled bladder and a controller for estimating the weight of a seat occupant based on the pressure of the bladder fluid.
Figure 1B:
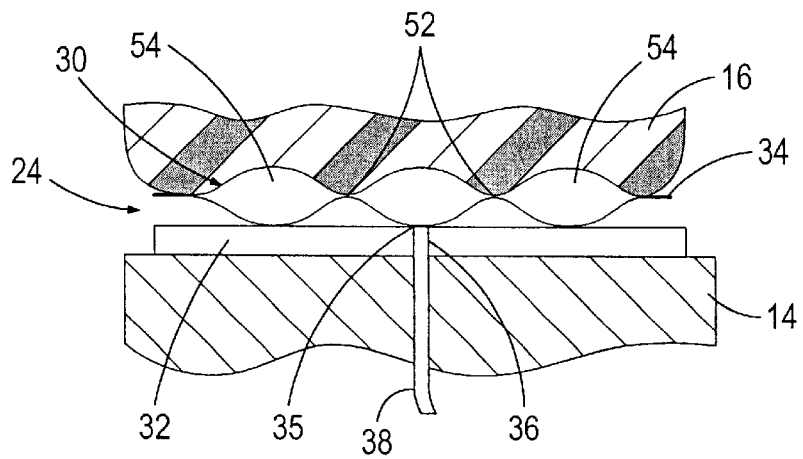
FIG. 1B is an enlarged view of a portion of FIG. 1A, illustrating the fluid-filled bladder in cross-section.

Referring to the drawings, and particularly to FIG. 1A and 1B, the reference numeral 10 generally designates a vehicle occupant weight estimation apparatus including a fluid-filled bladder 30 formed of elastomeric material such as urethane. The vehicle seat, generally designated by the reference numeral 12, includes a rigid frame and spring suspension 14, a bottom foam cushion 16 and a back foam cushion 18. A set of posts 19 integral to the frame 14 attach the seat 12 to pair of tracks 20 (only one of which is shown in FIG. 1A), which in turn, are secured to the vehicle floor 22. The bladder 30 is depicted as part of an assembly 24, which is shown in more detail in FIG. 1B. The assembly 24 is sandwiched between the bottom cushion 16 and the suspension elements of frame 14 for the purpose of detecting the presence and weight of an occupant of seat 12. Finally, a fabric cover 26 envelopes the cushion 16, bladder assembly 24 and frame 14.

Referring particularly to FIG. 1B, the bladder 30 is disposed between the bottom cushion 16 and a semi-rigid backer board 32 in contact with the frame 14. Additionally, a felt pad may be inserted between the backer board 32 and frame 14. The bladder 30 has a continuous weld 34 about its periphery and contains a fluid such as silicone that is non-corrosive and not subject to freezing or break-down at extreme ambient temperatures. A bladder exit port 35 located approximately at the center of weight of the fluid is coupled to a tube 38, which passes through an aperture 36 in the backer board 32 (and felt pad, if used). The tube 38 is coupled to a pressure sensor 40, which may be attached to the lower portion of frame 14 as shown in FIG. 1A, the sensor 40 developing an electrical signal on line 42 that is representative of the fluid pressure in the bladder 30. A temperature sensor (not shown), which may be integrated with the pressure sensor 40, provides an electrical output signal on line 44 indicative of the bladder and foam temperature. The pressure and temperature signals on lines 42 and 44 are applied as inputs to a microprocessor-based controller 46 that determines if the seat 12 is occupied and estimates the weight of the occupant based on the pressure and temperature signals, possibly in combination with other inputs, such as an atmospheric pressure signal provided by pressure sensor 48. If the controller 46 is attached to the bottom of frame 14, the pressure and temperature sensors may be conveniently packaged within the controller housing. In any event, controller 46 produces an electrical output signal indicative of the weight estimation on line 50, which may be used, for example, as a factor in determining whether and how forcefully to deploy air bags or other pyrotechnically deployed restraints in a crash event.

In general, the fluid in bladder 30 has a nominal or unloaded pressure that provides a baseline pressure measurement, and the pressure increases monotonically with occupant weight applied to the seat cushion 16. The temperature measurement is used to compensate the weight measurement for temperature dependent changes in foam and bladder stiffness to provide a weight measurement that is insensitive to temperature variations. Preferably, the pressure sensor 40 is configured to sense the differential or gage pressure of the fluid (that is, the pressure difference between atmospheric pressure and bladder fluid pressure) in order to provide a pressure measurement that is insensitive to atmospheric pressure variations due to changing weather patterns or altitude. In this case, the pressure sensor 40 includes a second inlet (not shown) open to atmospheric pressure. Alternately, the sensor 40 may provide an absolute pressure measurement of the bladder fluid, and the controller 46 may compensate the measurement for atmospheric pressure variations by reducing the fluid pressure measurement by the atmospheric pressure measurement provided by sensor 48.

In the illustrated embodiment, the upper and lower surfaces of the bladder 30 are welded together in various patterns, as indicated by the reference numeral 52 in FIG. 1B, so as to divide the bladder 30 into a series of contiguous cells 54. The welds 52 are not continuous so that fluid can freely flow between adjacent cells. The array of cells 54 minimizes the amount of fluid required to detect occupant weight, thereby minimizing the weight of the fluid-filled bladder 30, and prevents the fluid from pooling in proximity to an unloaded area of the seat cushion 16.

The present invention is particularly directed to a method of producing fluid filled bladders for weight sensing systems such as described above, as well as to an improved weight sensing method that is not subject to errors related to initial stressing of the bladder material. The problem, as explained above, is that bladder 30 has a tendency to stretch during the injection of the silicone fluid, and that such stretching creates an initial stress in the bladder material, which in turn, biases the fluid pressure measured by pressure sensor 40. The degree of stretching, and hence the degree of pressure bias, varies from bladder to bladder, but in each case, gradually diminishes over time. Thus, it is difficult if not impossible to reliably and accurately compensate for the bias by means of an offset, for example. According to the invention, the initial stress imparted to the bladder material is relieved prior to installation of the bladder 30 in a vehicle seat 12 by heating and cooling the bladder 30 in a quick annealing process.

Figure 2:
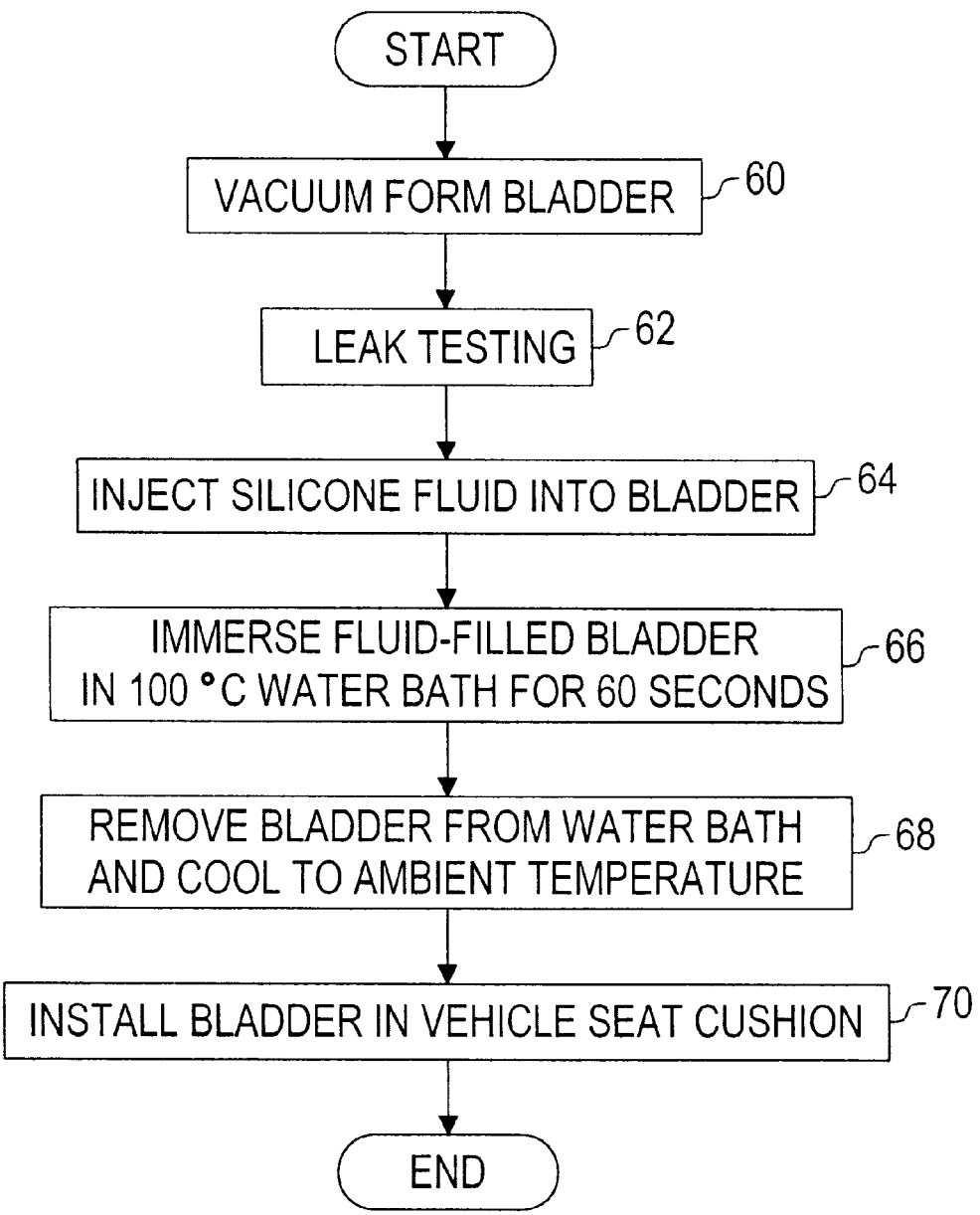
FIG. 2 is a process flow diagram for producing a fluid-filled bladder according to a preferred embodiment of this invention.

In a preferred implementation of this invention, the annealing process involves immersing a fluid-filled bladder 30 in high temperature water for a time period of approximately 60 seconds. The associated bladder production steps are depicted in the process flow diagram of FIG. 2 by the blocks 60–70. First, the bladder is manufactured by a conventional vacuum forming process and subjected to leak testing, as indicated at blocks 60 and 62. The leak testing may involve, for example, injecting a small quantity of air into the bladder, and immersing the bladder in a water bath to see if any of the air escapes. Then, the bladder is evacuated and filled with silicone fluid, as indicated at block 64. The fluid-filled bladder is then immersed in a 100° C. water bath for a predefined interval such as 60 seconds, whereupon it is removed and allowed to cool to ambient temperature in a relaxed orientation, as indicated at blocks 66 and 68. This may be conveniently achieved by placing the bladders in racks or cages that pass through the water bath as part of an automated process. In fact, the cooling may be achieved by passing the bladders through a cold water bath, if desired. After cooling, the bladders are ready for installation in a vehicle seat, as indicated at block 70, completing the process flow diagram.

Alternative implementations of the annealing process include heating the bladders by contact with a heated plate, or by exposure to steam or radiant heat. Additionally, the bladder 10 may be heated by pre-heating the silicone fluid, or by injecting heated air into an empty bladder before fluid injection. If the duration of the annealing process is less critical, the bladders may be annealed by long term soaking in an oven—two hours at 85° C., for example. In each case, the initial stress in the bladder material is quickly relieved, eliminating any pressure measurement bias associated with the stress.

Of course, the time required to carry out the annealing process is a significant concern in a mass production setting, and our testing has revealed that with the preferred method mentioned above, virtually all of the initial stress is relieved by immersing fluid-filled bladders in boiling water for an period of approximately 60 seconds. While the present invention has been described in reference to the illustrated embodiments, it is expected that various modifications in addition to those mentioned above will occur to those skilled in the art, and that methods incorporating such modifications may fall within the scope of this invention, which is defined by the appended claims.

What is claimed is:

1. A method of producing a fluid-filled bladder to be installed in a vehicle seat for sensing occupant weight applied to the seat, the method comprising the steps of:

forming a bladder of elastomeric material for receiving a fluid; and heating and then cooling the bladder to relieve stress caused by stretching of the elastomeric material.

2. The method of claim 1, wherein the bladder is filled with said fluid prior to the heating and cooling step.

3. The method of claim 2, wherein the step of heating the bladder comprises immersing the bladder in a bath of heated water.

4. The method of claim 2, wherein the step of heating the bladder comprises placing the bladder in a heated chamber.

5. The method of claim 2, wherein the step of heating the bladder comprises contacting the bladder with a heated plate.

6. The method of claim 1, wherein the fluid is pre-heated, and the step of heating the bladder comprises filling the bladder with the pre-heated fluid.

7. The method of claim 1, comprising the steps of:

filling the bladder with air prior to the heating step; and after the cooling step, evacuating the air from the bladder and filling the bladder with said fluid.

8. A method of sensing an occupant weight applied to a vehicle seat by measuring a pressure in an elastomeric bladder filled with a fluid and installed in the vehicle seat, the improvement wherein:

the bladder is heated and then cooled prior to installation in the vehicle seat to relieve an initial stress caused by stretching of the bladder.

9. The method of claim 8, wherein the bladder is filled with said fluid prior to said heating.

10. The method of claim 9, wherein the bladder is heated by immersing it in a bath of heated water.

11. The method of claim 9, wherein the bladder is heated by placing it in a heated chamber.

12. The method of claim 9, wherein the bladder is heated by contacting it with a heated plate.

13. The method of claim 8, wherein the fluid is pre-heated, and the bladder is heated by filling it with the pre-heated fluid.

14. The method of claim 8, wherein the bladder is filled with air prior heating the bladder, and after cooling of the bladder, the air is evacuated from the bladder, the bladder is filled with said fluid.

* * * * *